Nov. 15, 1949     C. F. JENSKY     2,488,197
FROZEN FOOD CHEST FOR MECHANICAL REFRIGERATORS
Filed Dec. 23, 1946
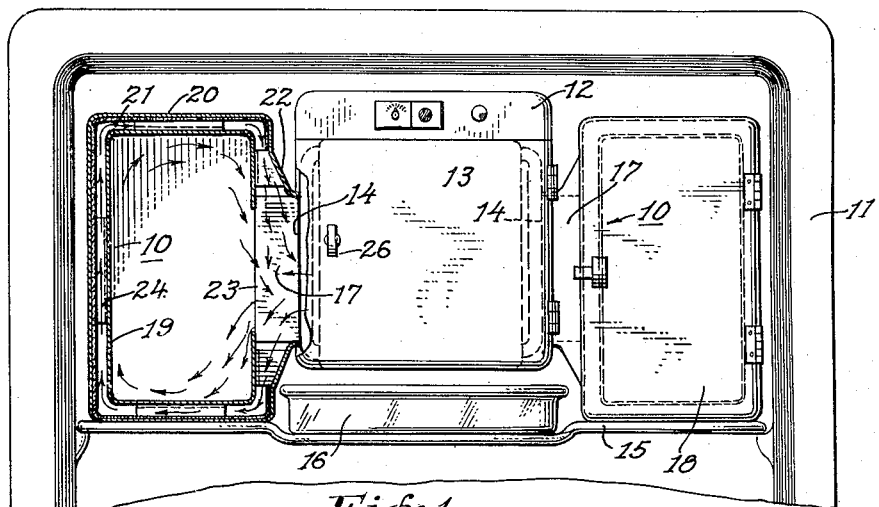
Fig. 1.
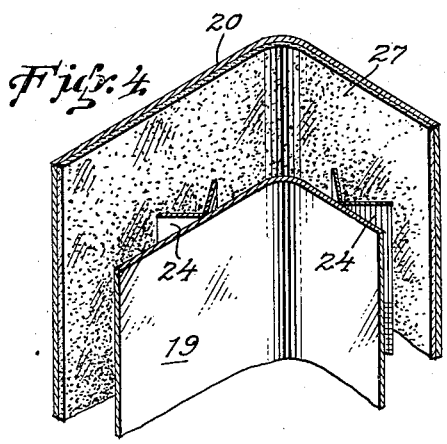
Fig. 4.
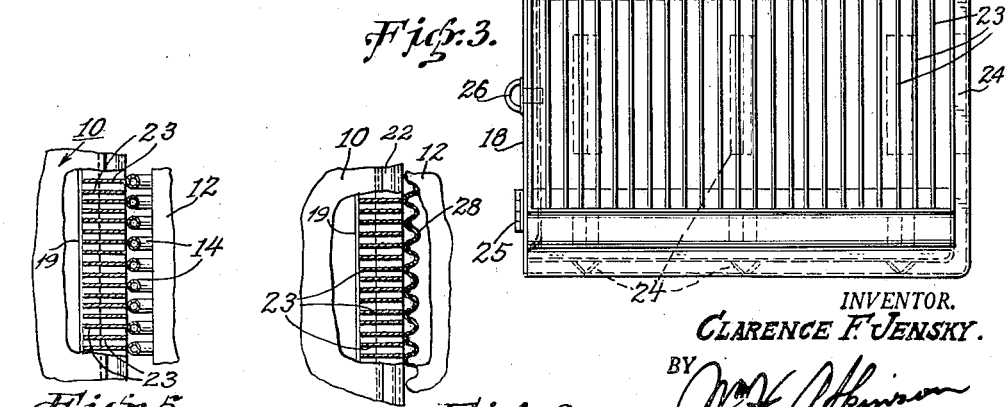
Fig. 3.
Fig. 5.     Fig. 6.
INVENTOR.
CLARENCE F. JENSKY.
BY
ATTORNEY Patented Nov. 15, 1949

2,488,197

UNITED STATES PATENT OFFICE 2,488,197

FROZEN FOOD CHEST FOR MECHANICAL REFRIGERATORS

Clarence F. Jensky, Palo Alto, Calif., assignor to Technical Products Co., Palo Alto, Calif., a copartnership Application December 23, 1946, Serial No. 717,979

12 Claims. (Cl. 62—89)

1

My present invention relates generally to home refrigeration and more particularly to an improvement by which a conventional mechanical refrigerator of present day household design may be provided with a frozen food storage compartment in a novel and inexpensive manner.

Another object of my invention is to provide an insulated frozen food accommodating container of novel construction which may be placed within a conventional mechanical refrigerator for the storage of frozen foods.

A further object of the invention is to provide a removable freezing compartment of novel design which may be positioned within a refrigerator in proper thermal association with a mechanical refrigerating unit without interfering with the normal lower temperature producing function of the refrigerating unit of the refrigerator.

Another object of the invention is to provide a new and novel frozen food container which may be positioned in heat transferring relation with the mechanical refrigerating unit of a refrigerator without materially interfering with the normal operation of the refrigerating unit in maintaining foods externally of my improved frozen food container in a properly refrigerated condition.

Another object of my invention is to provide a novel container for the storage of frozen foods within a mechanical refrigerator not equipped with such a compartment and which may be positioned to operate in thermal association with the refrigerating unit of a refrigerator and/or removed therefrom without requiring any special tools or attachments and which when in use will operate without materially affecting the normal refrigerator cooling characteristics of the mechanical refrigerator unit.

At the present time manufacturers of mechanical refrigerator units have recognized that the sale of frozen foods has presented to housewives the problem of preserving these frozen food packages until their time of use, and recognizing this need the present designs for mechanical refrigerators contemplate the provision of an additional space in each refrigerator unit for this purpose. In many cases this frozen food compartment is so located as to not seriously restrict the remaining storage space of the refrigerator but in doing this the manufacturers have found it necessary to more or less re-design their mechanical refrigeration producing unit. In some cases, however, objection has been raised to these new designs for the reason that they consume space for frozen foods where in many cases the purchaser of the

2 refrigerator has no such use in contemplation and as a result the frozen food compartment takes up space within the refrigerator which cannot be used for any other purpose. It is therefore, a further object of my invention to provide an improved frozen food compartment which may be optionally used with the mechanical refrigerating unit of a refrigerator of conventional type without seriously interfering with the normal operations of the refrigerating unit in maintaining a proper temperature within the remaining storage space of the refrigerator and which when not required may be easily and conveniently removed to the end that the space which would have been occupied thereby will be available for normal refrigerating purposes.

Other objects and advantages of the invention will be in part evident to those skilled in the art and in part pointed out hereinafter in connection with the accompanying drawings, wherein there is shown by way of illustration and not of limitation a preferred embodiment thereof.

In the drawing:

Figure 1 is a fragmentary front view showing the upper portion of a conventional mechanical refrigerator open and with one of my improved frozen food accommodating units positioned at each side of the mechanical refrigerating unit of the refrigerator, Figure 2 is a plan view of one of the units shown in Figure 1 of the drawing, Figure 3 is a side elevation of the unit as illustrated in Figure 2 of the drawing, Figure 4 is a fragmentary perspective view showing details of construction, and Figures 5 and 6 are fragmentary views partially in section illustrating the manner in which my improved unit may be associated with refrigerated temperature producing units of two conventional types in a refrigerator.

For the purpose of more particularly defining my invention I have, in Figure 1 of the drawing, shown two of my improved freezing and frozen food storage chests, designated by the numeral 10, as disposed within a conventional refrigerator 11, of the type having a refrigerating unit 12 disposed centrally in the upper part thereof. The refrigerating unit 12 includes trays for the freezing of ice cubes which are concealed behind a door 13 and at its sides it has exposed coils or other form of heat absorption surface 14 through which heat is extracted from the interior of the refrigerator 11 and absorbed by a circulating refrigerating gas or fluid, as is well understood. Extending across the refrigerator 11 and below the refrigerating unit 12 there is a shelf 15 which supports a drip pan 16 for the collection of drippings and/or water as occurs when the refrigerating unit 12 is periodically defrosted. With the shelf 15 arranged in this manner it will be seen that a food storage space will be provided at each side of the refrigerating unit 12, upon which bottles of milk and other tall food containers and packages may be normally stored and refrigerated. This upper shelf 15 of the refrigerator 11 as here disclosed is generally known to be the warmest part of the refrigerator and while some users have found that food may be maintained in a substantially frozen condition by banking it up against the exposed heat absorbing sides of the refrigerating unit 12 it so happens that when this is done the over-all refrigerating efficiency of the refrigerator 11 is seriously impaired. However, recognizing this latter fact and with a view to providing a means whereby frozen foods may be stored within a refrigerator, of the type here illustrated, without seriously impairing the efficiency of the refrigerating unit 12 I have, by my invention, provided a frozen food storage chest of novel construction. As here shown, my improved freezing and frozen food storage chest 10 is provided with a duct 17 at one side thereof which may be placed in heat conducting relation with a portion of the coils or heat absorbing surface 14 of the refrigerating unit 12 without seriously impairing its efficiency in maintaining a refrigerating temperature within the remaining portion of the refrigerator 11. In connection with this showing it should be explained that while I have shown two of my improved freezing and food storage chests 10 as positioned within the refrigerator 11, it will be understood that only one may be used if found sufficient. In this connection it will be noted that the heat conducting duct 17 of the chest 10 is here shown as symmetrically arranged with respect to the top and bottom thereof so that one of these chests 10 may be positioned either to the right or left of the refrigerating unit 12 by merely turning it over top for bottom and in each case a door 18, provided at one end for access to the interior thereof, will swing outwardly toward the adjacent wall of the refrigerator 11. With this particular construction it will be seen that the chest 10 may also be used in a refrigerator 11 of the type in which the refrigerating unit 12 is disposed in an upper right or left hand corner of the refrigerator. If space permits it is also conceivable that the chest 10 may be of a width sufficient to include substantially the entire space provided at one side of the refrigerating unit 12 in such a refrigerator or it may be of such a width, as is here illustrated, which would leave a remaining portion of the shelf 15 in such a refrigerator available for the storage of milk in bottles and like articles.

Before passing on to the remaining figures of the drawing it will also be noted upon reference to the sectionalized showing of the chest 10 at the left of Figure 1, that the chest 10 is of double walled construction and has an inner wall 19 and a spaced outer wall 20. The inner wall 19 should preferably have good heat conducting characteristics, but the outer wall 20 need not necessarily be of good heat conducting material. This outer wall 20, as here shown, may also be provided with a heat insulating lining 21 around its inner surface. At the point where the heat conducting duct 17 is provided in the side of the chest 10 the outer wall 20 is flared outwardly as at 22 so as to include substantially the entire length of the heat conducting duct 17. Disposed within and extending vertically in the duct 17, with the spaces therebetween in communication with the space between the inner and outer walls 19 and 20 of the chest 10, there are a plurality of louvers or heat conducting fins 23 between which air may also circulate from the interior of the chest 10 and/or the space between its double wall 19 and 20 to the heat absorbing coils or heat absorbing surface 14 of the refrigerating unit 12.

In the preferred arrangement the louvers or heat conducting fins 23 referred to above, will extend into the duct 17 from the inner wall 19 of the chest 10 to the heat absorbing surface 14 of the refrigerating unit 12 and when so dimensioned the spacings therebetween may be such that all or a lesser number of these fins will each contact with a coil of the refrigerating unit 12. With this construction it will be seen that the fins which do in fact contact with the heat absorbing surface 14 of the refrigerating unit 12 will in effect become a part thereof. This will be particularly true should the coils of the heat absorbing surface 14 become frosted. As a result the heat absorbing surface 14 of the refrigerating unit 12 will be increased to this extent and thus more effectively associated with the air circulating passageway between the inner wall 19 and the outer wall 20 of the chest 10. In this particular showing the inner wall 19 of the chest 10 is shown as open at the point where the duct 17 extends outwardly therefrom. The size of this opening in the wall 19 may be varied as conditions dictate. In the present instance the inner wall 19 is shown as extending slightly inward from the outer limits of the duct 17. A further feature which should be pointed out in connection with this showing is that, while the duct 17 is shown as positioned midway between the top and bottom of the chest 10, it may be located either above or below the horizontal center of the chest 10. On the other hand, if desired this opening in the inner wall 19 may be omitted entirely. It is also conceivable that the louvers or fins 23 may also be omitted or at least greatly reduced in number if the aforementioned opening is omitted from the wall 19 as the circulation of the heat ladened air will then be restricted to the circulating passageway which is formed between the inner wall 19 and the outer wall 20 of the chest 10.

By now referring to Figures 2 and 3 of the drawing it will be noted that the sectionalized portion of the showing in Figure 1 of the drawing has been taken along line I—I of Figure 2. In these latter figures it will also be noted that the chest 10 is of a length that substantially equals the depth of the refrigerator 11. While the duct 17 is here shown as extending along substantially the entire length of the chest 10 it will be understood that this duct 17 may be foreshortened where the dimensions of the heat absorbing surface 14 of the refrigerating unit 12 dictates such a change. The inner wall 19 and the outer wall 20 of the chest 10 are here shown as held in spaced relation by angularly bent strips of metal 24 which extend parallel with the normal direction of flow of air between these walls and because of their construction they will provide a minimum of interference with the circulation of air between these walls. As here indicated the door 18 of the chest 10 is supported at one side by hinges 25 and at its other side it has a latching means 26 for holding it in its closed position. However, instead of the latching means 26, it is also conceivable that the hinges 25 may be provided with a self-closing spring. In Figure 3 the louvers or fins 23 are shown as disposed vertically within the duct 17, but it is contemplated that these fins may be inclined either to the right or left as here viewed, where it is desired to provide for a contact between each of the fins 23 with one or more of the coils which form the heat absorbing surface 14 of the refrigerating unit 12.

Upon referring to Figure 4 of the drawing, it will be noted that when the inner wall 19 and the outer wall 20 are held in spaced relation by the angularly bent strips of metal 24, practically no obstruction to the circulation of air between these walls will be encountered. In this instance the outer wall 20 of the chest 10 is also illustrated as having an inner lining of heat insulating material 27. This material 27 may be of any moisture impervious material and in practice a coating of heat resisting paint has been found very satisfactory.

In Figure 5 of the drawing I have shown the louvers or heat conducting fins 23 within the duct 17 as being so spaced that every alternate fin will contact with one of the coils which make up the heat absorbing surface 14 of the refrigerating unit 12, and in Figure 6, the same arrangement of the fins 23 is shown as disposed in heat conducting relation against a heat absorbing surface 28 which is formed by a corrugated wall upon the refrigerating unit 12, but whether the refrigerating unit 12 is of the type having exposed coils, as shown in Figure 5 of the drawing, or of the type having a corrugated wall 28, as shown in Figure 6 of the drawing, it will be understood that the operation of my device will be identical.

In operation it will be seen that when one of my improved chests 10 is used in a refrigerator 11 of the type illustrated, the heat absorption area of the refrigerating unit 12 which is encompassed by the duct 17 will be less than one-half of the total heat absorbing surface 14 of the refrigerating unit. Under normal operating conditions it is contemplated that only one of these chests 10 will be used in a refrigerator of this type. However, if two of my improved frozen food storage chests 10 are used with the refrigerator 11, a large portion of the heat absorbing surface 14 of the unit will still be exposed externally of ducts 17 of the chests 10 for the absorption of heat from the remaining portion of the refrigerator 11. Where the refrigerating unit 12 is of the type having a corrugated heat absorbing wall 28, as shown in Figure 6 of the drawing, it will be seen that the bottom of the refrigerating unit 12 will also be exposed for the absorption of heat from the remaining portion of the refrigerator 11. This is due to the fact that in refrigerators of the type having a corrugated heat absorbing surface, the corrugations are extended around and under the bottom of the refrigerating unit. Under these conditions of use it will be seen that the heat from food stuffs stored in the chest 10 will be absorbed by the inner wall 19 and conducted to the space between it and the outer wall 20. Then due to difference in the temperatures at the top and bottom of this passageway there will be set up a convective circulation of air which will serve to move the heat ladened air to the heat absorption surface 14 while cooler chilling air will flow downwardly into the space between the inner wall 19 and outer wall 20 of the chest. At the same time when the inner wall 19 is left open at the point where the duct 17 is located, as indicated in Figure 1, there will also be a limited convective circulation of air within the chest and about the food stored therein, as indicated by the arrows applied to this figure of the drawing.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A removable freezing and food storage chest for use with refrigerators of the type having a mechanical refrigerating temperature producing unit with an exposed heat absorbing surface, comprising a heat insulated chest in which food may be stored having a door at one end for access to the interior thereof, and a single open ended duct extending through one of the walls of said chest and outwardly therefrom adapted to provide a conduit for a convective circulation of air from said chest to the heat absorbing surface of a mechanical refrigerating temperature producing unit when said chest is positioned within a refrigerator with the extending end of said duct in contact with and encompassing a portion of the heat absorbing surface of the mechanical refrigerating temperature producing unit of a refrigerator.

2. A removable freezing and food storage chest for use with refrigerators of the type having a mechanical refrigerating temperature producing unit with an exposed heat absorbing surface, comprising a heat insulated chest in which food to be refrigerated may be stored, said chest being adapted to be placed within a refrigerator adjacent its mechanical refrigerating temperature producing unit, and a single open duct extending outwardly from one of the walls of said chest adapted and arranged to be positioned with its extending end in heat transferring relation with the heat absorbing surface of a mechanical refrigerating temperature producing unit, whereby a refrigerating temperature will be maintained within said chest when said chest is positioned within a refrigerator with the extending end of said duct encompassing a portion of the heat absorbing surface of said mechanical refrigerating temperature producing unit.

3. In a refrigerating food storage apparatus the combination of, a refrigerator having a refrigerating compartment, a mechanical refrigerating temperature producing unit having an exposed heat absorbing surface disposed within said refrigerating compartment, a removable heat insulated chest in which food may be stored adapted to be positioned within said refrigerating compartment and adjacent said mechanical refrigerating temperature producing unit, and a single open ended duct extending outwardly from one of the walls of said chest adapted at its outer end to make contact with the heat absorbing surface of said mechanical refrigerating temperature producing unit when said chest is placed within said refrigerating compartment, said duct being adapted and arranged to encompass less than the total heat absorbing surface of said mechanical refrigerating temperature producing unit, whereby a freezing temperature will be maintained within said food storage chest without materially interfering with the normal operation of said refrigerator.

4. A removable freezing and frozen food storage chest for refrigerators of the type having a mechanical refrigerating temperature producing unit with an exposed heat absorbing surface extending along a side thereof, comprising a double walled rectangular compartment forming chest having a door providing access to the interior thereof, a single cold air circulating duct extending outwardly from the outer wall at one side of said chest, and a plurality of heat conducting fins extending vertically in spaced relation within said duct with the spaces therebetween in communication with the space between the double walls of said compartment forming chest, the perimeter of said duct being adapted to encompass a portion of the heat absorbing surface of the mechanical refrigerating temperature producing unit and support said fins with their outer edges in contact with the heat absorbing surface of said mechanical refrigerating temperature producing unit when said chest is placed within a refrigerator.

5. A removable freezing and frozen food storage chest for refrigerators of the type having a mechanical refrigerating unit with an exposed heat absorbing surface extending along a side thereof, comprising a double walled rectangular compartment forming chest having a door at one end providing access to the interior thereof, a single cold air circulating duct at one side of said chest and in communication with the space between the double walls thereof, and a plurality of heat conducting fins disposed in spaced relation within said duct and with the spaces therebetween also in communication with the space between the double walls of said compartment forming chest, said duct being extended outwardly from the outer wall at one side of said compartment forming chest and adapted when the chest is placed within a refrigerator to encompass a portion of the heat absorbing surface of its mechanical refrigerating unit and also support said fins with their outer edges in contact with the heat absorbing surface of said mechanical refrigerating unit, whereby said fins will serve to conduct heat from the space between the walls of said chest to the heat absorbing surface of said mechanical refrigerating unit.

6. A removable freezing and frozen food storage chest for refrigerators of the type having a mechanical refrigerating unit with an exposed heat absorbing surface extending along a side thereof, comprising a heat insulated double walled rectangular compartment forming unit having a door at one end providing access to the interior thereof, an air circulating duct extending outwardly from one of the walls of said chest, and a plurality of heat conducting fins extending vertically within said duct with the spaces therebetween in communication with the space between the double walls of said compartment forming unit, said duct being extended outwardly from one side of said compartment forming chest and adapted when the chest is placed within a refrigerator to encompass a portion of the heat absorbing surface of its mechanical refrigerating unit and also support said vertically extending fins in thermal contact with the heat absorbing surface of the mechanical refrigerating unit.

7. A frozen food storage container for mechanical refrigerators, comprising a double walled container having a door at one end providing access to the interior thereof, and a single heat conducting duct at one side thereof extending from the space between the double walls of said container and adapted to engage and encompass a portion of the heat absorbing surface of a mechanical refrigerating temperature producing unit within the refrigerator, whereby a heat transfer at a freezing temperature may be established between the double walls of said container when said storage container is positioned within the refrigerator with the open end of its heat conducting duct encompassing a portion of the heat absorbing surface of said mechanical refrigerating temperature producing unit.

8. A frozen food storage container for mechanical refrigerators, comprising a double walled container having a door at one end providing access to the interior thereof, an open ended duct at one side of said container extending from the exterior wall of said container and adapted to engage a portion of the heat transfer surface of a mechanical refrigerator unit, and a plurality of spaced vertically disposed heat conducting partitions disposed within said duct adapted to engage with the heat transfer surface of said mechanical refrigerator unit and with the spaces therebetween in communication with the interior of said container and the space between its double walls, whereby a circulation of air at freezing temperature may be circulated between the double walls of said container while heat is conducted by said fins from the interior thereof to the heat transfer surface of said mechanical refrigerator unit when in use.

9. In a refrigerating apparatus, the combination of a refrigerator cabinet of conventional design, a mechanical refrigerating temperature producing unit having an exposed heat absorption surface located within said refrigerator cabinet, a shelf for the storage of food stuffs at one side of said refrigerating temperature producing unit, a removable frozen food accommodating chest having a door at one end for access to the interior thereof adapted to be placed upon said shelf, said chest having an open ended duct extending outwardly from one side thereof and encompassing a limited area of the heat absorption surface of said refrigerating temperature producing unit, and a plurality of metallic heat conducting members disposed within said duct and extending into contact with the heat absorbing surface of said refrigerating temperature producing unit, whereby a convective circulation of air and a mechanical conduction of heat at a freezing temperature will be established from the space between the double walls of said chest to the heat absorbing surface of said mechanical refrigerating temperature producing unit.

10. The invention, as described in claim 9, characterized by the fact that the duct extending from the side of said chest is so disposed between the top and bottom walls of the chest that it may be positioned at either side of the mechanical refrigerating unit with its door exposed by merely turning it top for bottom 11. In a refrigerating apparatus, the combination of a refrigerator cabinet of conventional design having a mechanical refrigerating temperature producing unit suspended from its upper wall and with at least one of its sides exposed and forming a heat absorption surface, a shelf for the storage of food stuffs disposed at the side of said refrigerating temperature producing unit, a removable frozen food accommodating chest of heat insulating construction having a door for access to the interior thereof, an open ended duct extending outwardly from one side of said chest and adapted when said chest is placed upon said shelf to encompass a portion of the heat absorption surface of said mechanical refrigerating unit, and a plurality of vertically disposed fins arranged in spaced relation within said duct and adapted to contact with the duct encompassed heat absorbing surface of said refrigerating temperature producing unit with the spaces therebetween in communication with the interior of said container, whereby a conduction of heat and circulation of air at a freezing temperature will be established between the interior of said chest and said heat absorbing surface.

12. A removable frozen food storage chest for refrigerators of the type having a mechanical refrigerating unit with an exposed heat absorbing surface extending along a side thereof, comprising a rectangular compartment forming unit of heat insulated construction having a door providing access to the interior thereof, a heat conducting conduit extending outwardly from one side of said compartment forming unit adapted to be placed in heat transfering relation with the exposed heat absorbing surface of a mechanical refrigerating temperature producing unit, and a plurality of metallic heat conducting elements extending in spaced relation through said conduit with their outer ends exposed and adapted to make a heat conducting contact with the exposed heat absorbing surface of said mechanical refrigerating unit when said chest is placed within the refrigerator, whereby the heat absorbing surface of the mechanical refrigerating unit of a refrigerator will be thereby increased and extended into said heat conducting conduit.

CLARENCE F. JENSKY.

REFERENCES CITED

The following references are of record in the file of this patent:

UNITED STATES PATENTS

| Number | Name | Date |
|---|---|---|
| 1,948,681 | Sawyer | Feb. 27, 1937 |
| 2,284,293 | Mills | May 26, 1942 |
| 2,291,736 | Lindblom | Aug. 4, 1942 |
| 2,414,588 | Elliott | Jan. 21, 1947 |
| 2,444,887 | Wyeth | July 6, 1948 |